(12) United States Patent
Yoshioka et al.

(10) Patent No.: US 11,459,941 B2
(45) Date of Patent: Oct. 4, 2022

(54) ENGINE CONTROL DEVICE

(71) Applicant: TOYOTA JIDOSHA KABUSHIKI KAISHA, Aichi-ken (JP)

(72) Inventors: Shinji Yoshioka, Toyota (JP); Shinichi Nakagoshi, Miyoshi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/669,362

(22) Filed: Feb. 11, 2022

(65) Prior Publication Data
US 2022/0260006 A1    Aug. 18, 2022

(30) Foreign Application Priority Data
Feb. 15, 2021 (JP) .............................. JP2021-021777

(51) Int. Cl.
*F02B 37/18* (2006.01)
*F02D 41/02* (2006.01)
*F02D 41/32* (2006.01)
*F02D 41/14* (2006.01)

(52) U.S. Cl.
CPC ........ *F02B 37/183* (2013.01); *F02D 41/0235* (2013.01); *F02D 41/1454* (2013.01); *F02D 41/32* (2013.01); *F02D 2200/04* (2013.01); *F02D 2200/501* (2013.01)

(58) Field of Classification Search
CPC .... F02B 37/18; F02B 37/183; F02D 41/0295; F02D 41/1408; F02D 41/1454; F02D 41/1475
USPC ..................................... 60/602, 603
See application file for complete search history.

(56) References Cited

U.S. PATENT DOCUMENTS

2011/0126812 A1    6/2011   Miyashita
2020/0263650 A1 *  8/2020   Okubo ................ F02D 41/0295

FOREIGN PATENT DOCUMENTS

JP      4952847 B2     6/2012
WO    2010058461 A1    5/2010

* cited by examiner

*Primary Examiner* — Erick R Solis
(74) *Attorney, Agent, or Firm* — Hauptman Ham, LLP

(57) ABSTRACT

An engine control device performs air-fuel ratio control of an engine through a main air-fuel ratio feedback process based on an output of a front air-fuel ratio sensor, a sub air-fuel ratio feedback process of alternately switching a target air-fuel ratio between a lean-side target air-fuel ratio and a rich-side target air-fuel ratio based on an output from a rear air-fuel ratio sensor. The engine control device performs a limiting process of setting an upper limit of a control range of an opening level of a waste gate valve to be less when a combustion operation of the engine continues to be performed for a long time without being stopped by fuel cutoff than otherwise.

5 Claims, 10 Drawing Sheets

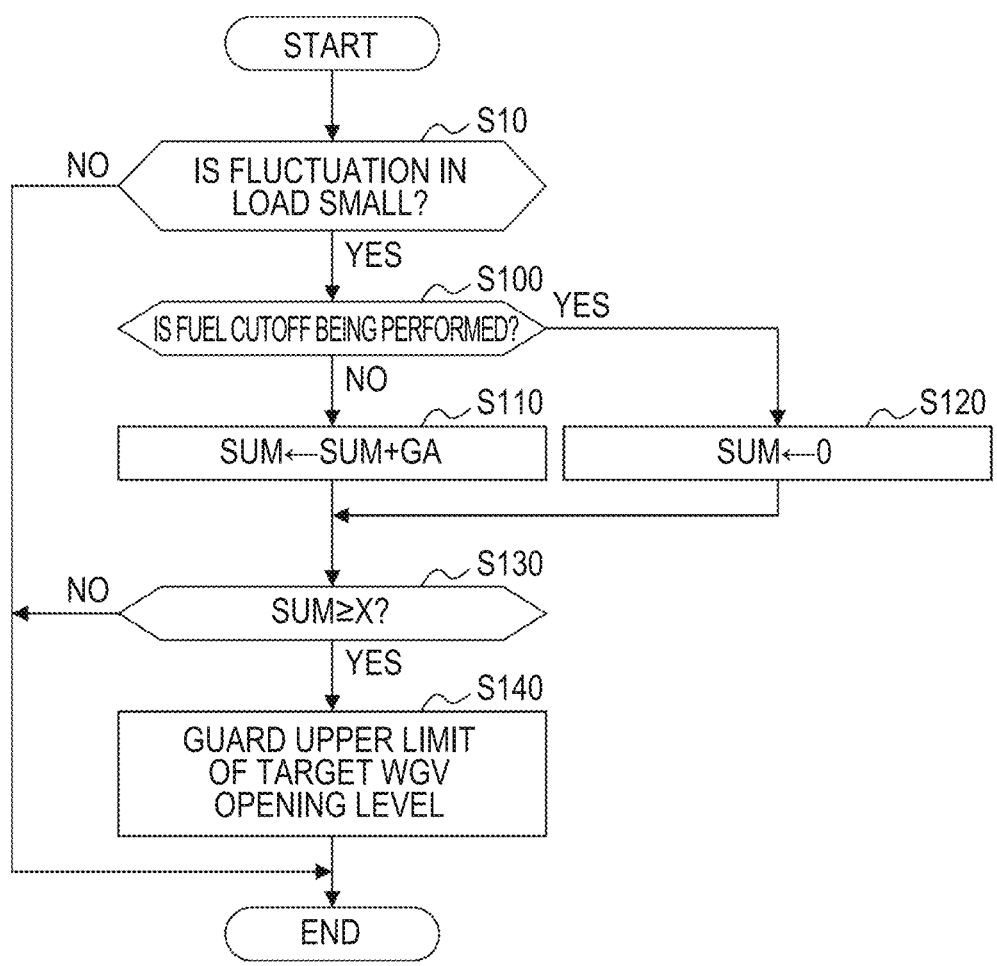

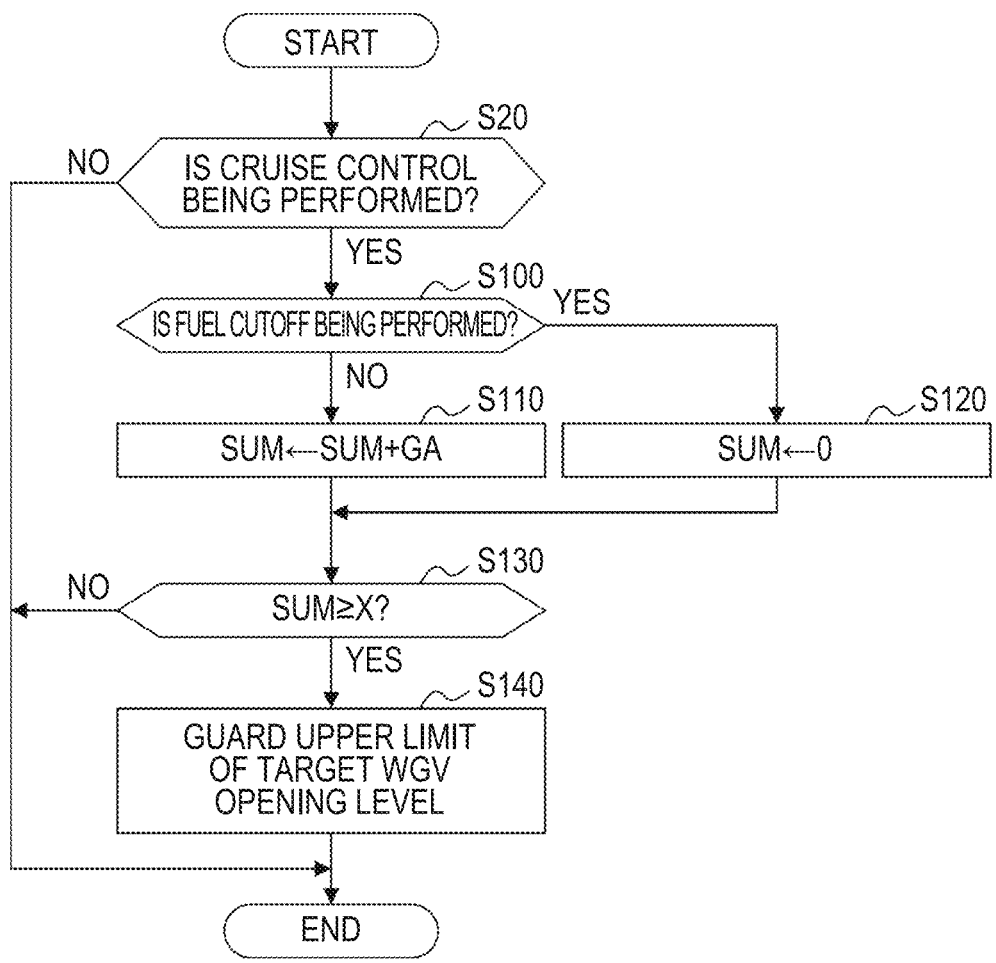

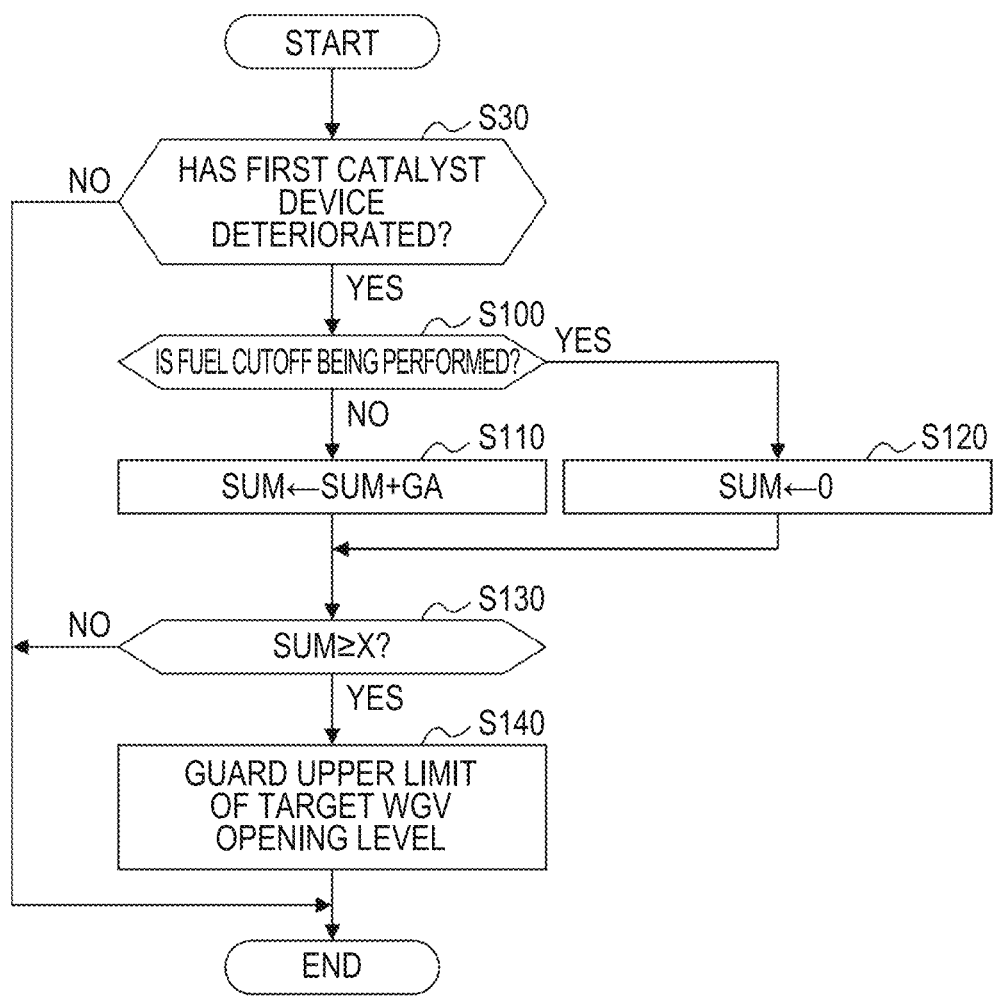

ENGINE CONTROL DEVICE

CROSS-REFERENCE TO RELATED APPLICATION

This application claims priority to Japanese Patent Application No. 2021-021777 filed on Feb. 15, 2021, incorporated herein by reference in its entirety.

BACKGROUND

1. Technical Field

The disclosure relates to an engine control device that performs air-fuel ratio control in a supercharged engine.

2. Description of Related Art

An engine such as an onboard engine including a catalyst device for exhaust emission control that carries a three-way catalyst and has an oxygen storage capability is known. A control device for an engine equipped with such a catalyst device in which an air-fuel ratio of an air-fuel mixture which is combusted in a combustion chamber is controlled through the two of main and sub air-fuel ratio feedback processes is also known. In the main air-fuel ratio feedback process, feedback control of an amount of fuel injected from an injector is performed such that the air-fuel ratio of the air-fuel mixture reaches a target air-fuel ratio based on an output from an air-fuel ratio sensor which is provided in a part upstream from the catalyst device in an exhaust passage. In the sub air-fuel ratio feedback process, the target air-fuel ratio is alternately switched between a rich-side target air-fuel ratio and a lean-side target air-fuel ratio based on an output from another air-fuel ratio sensor which is provided in a part downstream from the catalyst device in the exhaust passage. An air-fuel ratio which is slightly richer than a stoichiometric air-fuel ratio is set as the rich-side target air-fuel ratio. An air-fuel ratio which is slightly leaner than the stoichiometric air-fuel ratio is set as the lean-side target air-fuel ratio. In the engine in which such air-fuel ratio control is performed, rich combustion at an air-fuel ratio slightly richer than the stoichiometric air-fuel ratio and lean combustion at an air-fuel ratio slightly leaner than the stoichiometric air-fuel ratio are alternately repeated.

On the other hand, WO 2010/058461 discloses an engine control device that performs air-fuel ratio control using the aforementioned two air-fuel ratio feedback processes in an engine including a turbocharger with a waste gate valve. In the engine control device described in the publication, a period of time after an air-fuel ratio of an air-fuel mixture combusted in a combustion chamber has been changed and until a change based on the change in air-fuel ratio appears in an output of a front air-fuel ratio sensor is measured in air-fuel ratio control. A period of time taken for the exhaust gas from the combustion chamber to reach the front air-fuel ratio sensor changes depending on opening and closing of the waste gate valve. Accordingly, in the engine control device described in the publication, the period of time is measured from when an opening level of the waste gate valve is equal to or less than a predetermined opening level.

SUMMARY

In a catalyst device in rich combustion, hydrocarbons (HC) in exhaust gas is adsorbed on the surface of a precious metal serving as a three-way catalyst. Some of the adsorbed hydrocarbons are polymerized into higher hydrocarbons which coat the surface of the precious metal. As a result, a catalytic reaction of the precious metal is inhibited. When fuel cutoff of the engine is performed and a large amount of oxygen flows into the catalyst device, the higher hydrocarbons with which the surface of the precious metal is coated are oxidized and removed. However, when a combustion operation of the engine continues to be performed for a long time without being stopped by fuel cutoff, an exhaust emission control capability of the catalyst device decreases because the catalytic reaction of the precious metal is inhibited due to the coating with higher hydrocarbons.

On the other hand, in an engine including a turbocharger with a waste gate valve, a method in which exhaust gas comes into contact with the catalyst device changes depending on an opening level of the waste gate valve. The inhibition of the catalytic reaction of a precious metal due to the coating with higher hydrocarbons and the change of the method in which exhaust gas comes into contact with the catalyst device depending on the opening level of the waste gate valve may together cause deterioration in the emissions of the engine.

An engine control device according to an aspect of the disclosure is applied to an engine including a combustion chamber in which combustion of an air-fuel mixture is performed, an intake air passage into which intake air introduced into the combustion chamber flows, an injector that injects fuel into the intake air, an exhaust passage into which exhaust gas generated by combustion of the air-fuel mixture in the combustion chamber flows, a turbocharger including a compressor that is installed in the intake air passage and a turbine that is installed in the exhaust passage, a catalyst device that is a catalyst device for exhaust emission control provided downstream from the turbine in the exhaust passage, that carries a three-way catalyst, and that has an oxygen storage capability, a front air-fuel ratio sensor that is installed in a part upstream from the catalyst device in the exhaust passage, and a rear air-fuel ratio sensor that is installed in a part downstream from the catalyst device in the exhaust passage. The turbine in a turbocharger of the engine includes a turbine wheel that is rotated by exhaust gas applied thereto, a bypass passage that is a passage for exhaust gas bypassing the turbine wheel, and a waste gate valve that is a valve for changing a passage area for exhaust gas of the bypass passage. The engine control device is configured to control an opening level of the waste gate valve depending on an operation state of the engine. The engine control device is configured to perform: a main air-fuel ratio feedback process of feedback-controlling an amount of fuel injected from the injector such that an air-fuel ratio of an air-fuel mixture which is combusted in the combustion chamber reaches a target air-fuel ratio based on an output from the front air-fuel ratio sensor; a sub air-fuel ratio feedback process of alternately switching the target air-fuel ratio between a rich-side target air-fuel ratio which is an air-fuel ratio richer than a stoichiometric air-fuel ratio and a lean-side target air-fuel ratio which is an air-fuel ratio leaner than the stoichiometric air-fuel ratio and determining a switching timing of the target air-fuel ratio based on an output from the rear air-fuel ratio sensor; and a limiting process of setting an upper limit of a control range of the opening level of the waste gate valve to be less when a combustion operation of the engine has been continuously performed for a long time without being stopped than otherwise.

In the engine control device, the target air-fuel ratio is alternately switched between the lean-side target air-fuel ratio and the rich-side target air-fuel ratio in the sub air-fuel ratio feedback process. In lean combustion in which the lean-side target air-fuel ratio is set as the target air-fuel ratio, exhaust gas including surplus oxygen flows into the catalyst device. At this time, the catalyst device promotes cleaning of the exhaust gas using the three-way catalyst by storing the surplus oxygen in the exhaust gas to make the inside thereof a stoichiometric atmosphere. When lean combustion continues to be performed, the catalyst device cannot store surplus oxygen any more at last and exhaust gas including surplus oxygen flows out, that is, a lean failure occurs. When the target air-fuel ratio is switched to the rich-side target air-fuel ratio to start rich combustion at this time, exhaust gas including an unused fuel component flows into the catalyst device. Then, the catalyst device promotes cleaning of exhaust gas using the three-way catalyst by discharging oxygen stored in the lean combustion to make the inside thereof a stoichiometric atmosphere. When rich combustion continues to be performed, the catalyst device discharges all oxygen stored therein at last and exhaust gas including an unused fuel component flows out, that is, a rich failure occurs. At this time, when the target air-fuel ratio is switched to the lean-side target air-fuel ratio to start lean combustion and the lean combustion and the rich combustion are alternately performed, deviation from a steady state in air-fuel ratio in the main air-fuel ratio feedback process is curbed. Occurrence of a lean failure and a rich failure can be ascertained from an output of the rear air-fuel ratio sensor. Therefore, in the sub air-fuel ratio feedback process, a switching timing of the target air-fuel ratio is determined based on the output of the rear air-fuel ratio sensor.

In the turbine including the bypass passage, two exhaust passages including a passage passing through the turbine wheel and a passage passing through the bypass passage are provided. Flow rate proportions of exhaust gas passing through the two passages change depending on an opening level of the waste gate valve. When the opening level of the waste gate valve increases, the flow rate proportion of exhaust gas passing through the turbine wheel decreases and the flow rate proportion of exhaust gas passing through the bypass passage increases. Since a flow of exhaust gas flowing from the turbine wheel to the catalyst device is a swirl flow, exhaust gas uniformly spreads to the whole catalyst device. On the other hand, a flow of exhaust gas flowing from the bypass passage to the catalyst device is a blow-down flow and thus exhaust gas is concentrated on a part of the catalyst device. Accordingly, when the opening level of the waste gate valve is high, a flow of exhaust gas in the catalyst device is biased and an occurrence cycle of the lean failure and the rich failure is shortened. When the lean failure occurs, an amount of NOx discharged from the catalyst device increases temporarily. When the rich failure occurs, an amount of THC discharged from the catalyst device increases temporarily. Accordingly, when the occurrence cycle of the rich failure and the lean failure is shortened, the amount of NOx and the amount of THC discharged from the catalyst device increase.

On the other hand, when the rich combustion is performed in the catalyst device, hydrocarbons in exhaust gas are adsorbed on the surface of precious metal serving as the three-way catalyst. Some of the adsorbed hydrocarbons are polymerized into higher hydrocarbons. Due to coating of the surface of the precious metal with higher hydrocarbons, a catalytic reaction of the precious metal is inhibited. When fuel cutoff is performed in the engine and a large amount of oxygen flows into the catalyst device, the higher hydrocarbons with which the surface of the precious metal is coated are oxidized and removed from the surface of the precious metal. When the combustion operation of the engine continues to be performed for a long time without being stopped by fuel cutoff, an exhaust emission control capability of the catalyst device decreases.

In this way, both the shortening of the occurrence cycle of the lean failure and the rich failure due to an increase in opening level of the waste gate valve and the coating of the surface of the precious metal with higher hydrocarbons serve as causes of deterioration in the emissions of the engine. On the other hand, with the engine control device, the upper limit of the control range of the opening level of the waste gate valve is set to be less when the combustion operation of the engine continues to be performed for a long time without being stopped than otherwise through the limiting process. That is, in a state in which the exhaust emission control performance of the catalyst device has decreased due to coating with higher hydrocarbons, the opening level of the waste gate valve is not set to be high. Accordingly, it is possible to prevent the two factors causing a deterioration in emissions from occurring simultaneously. As a result, with the engine control device, it is possible to curb a deterioration in emissions of the engine.

When a load of the engine changes greatly without performing fuel cutoff, exhaust gas including oxygen may flow into the catalyst device in this course of change and higher hydrocarbons with which the surface of the precious metal is coated may be removed. Accordingly, when the combustion operation of the engine continues to be performed for a long time without being stopped by fuel cutoff and the load of the engine changes greatly, the exhaust emission control performance of the catalyst device is less likely to decrease due to coating with higher hydrocarbons. In this case, the limiting process in the engine control device can be performed based on the premise that fluctuation in engine load is small.

Cruise control for automatically operating an accelerator such that a vehicle speed is maintained at a preset speed may be performed in a vehicle in which the engine is mounted. When the cruise control is being performed, change in engine load is more likely to be curbed than when a driver is operating an accelerator pedal. Accordingly, when cruise control is not being performed and a driver is operating the accelerator pedal, the exhaust emission control performance of the catalyst device may be less likely to decrease due to coating with higher hydrocarbons when the combustion operation of the engine continues to be performed for a long time. In this case, the limiting process in the engine control device can be performed based on the premise that the cruise control is being performed.

In a state in which the catalyst device has not deteriorated, even when fuel cutoff is not performed for a long time, the exhaust emission control performance may not decrease due to coating with higher hydrocarbons. In this case, the limiting process in the engine control device can be performed based on the premise that deterioration of the catalyst device has been ascertained.

Whether the combustion operation of the engine continues to be performed for a long time without being stopped can be determined, for example, based on a total value of an intake air flow rate into the engine in a period in which the combustion operation continues to be performed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

Figure 5:
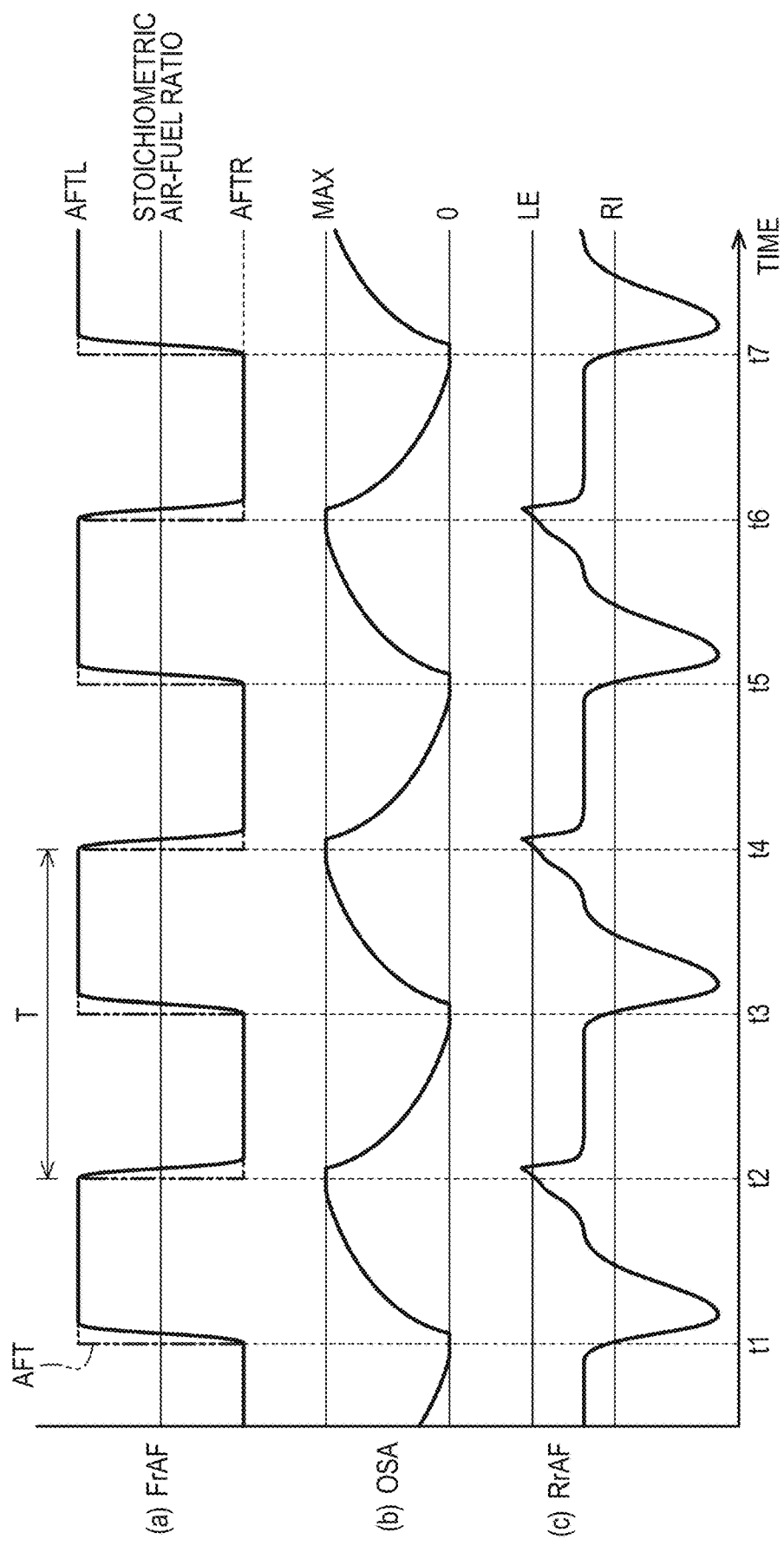
Figure 6:
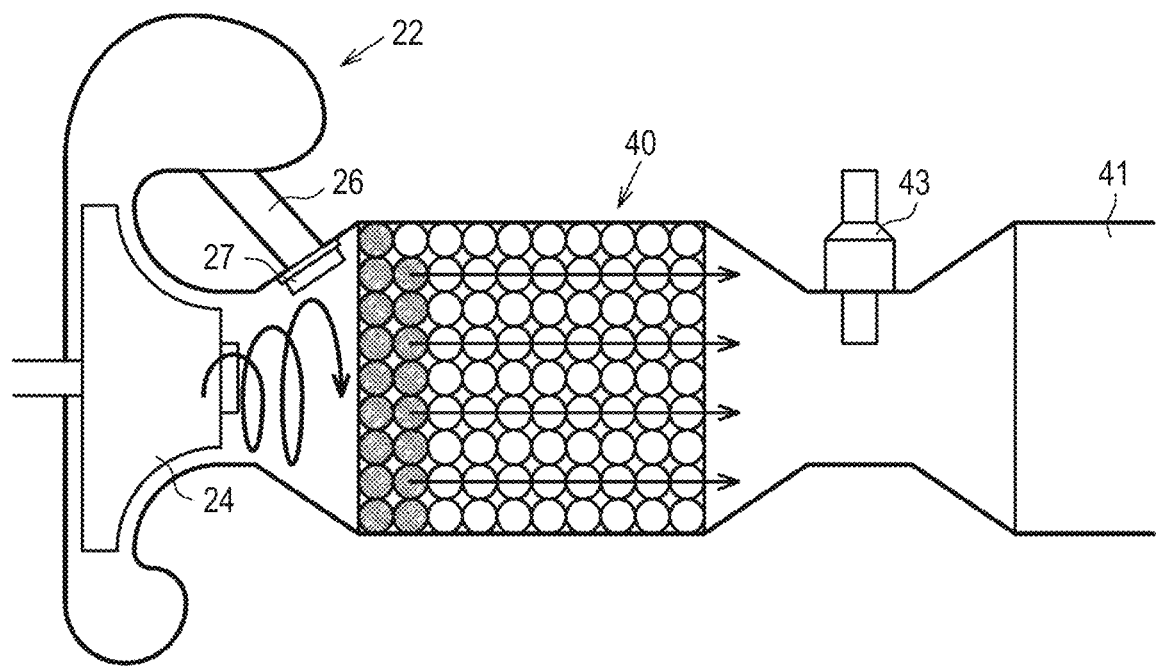
Figure 7:
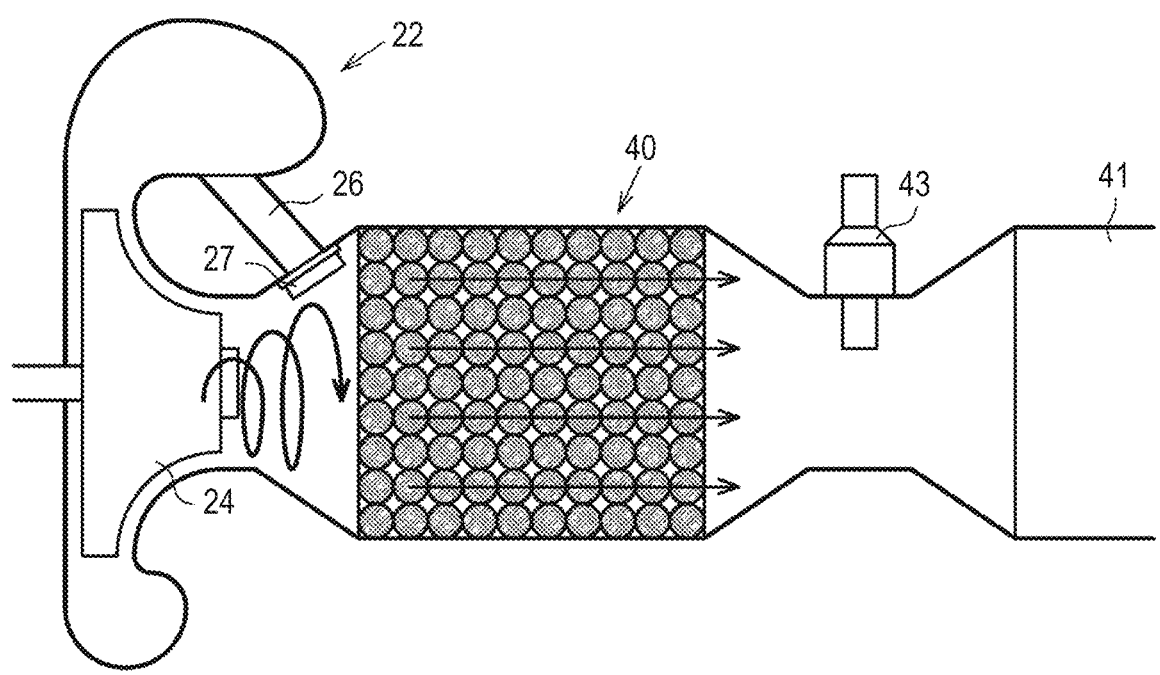
Figure 8:
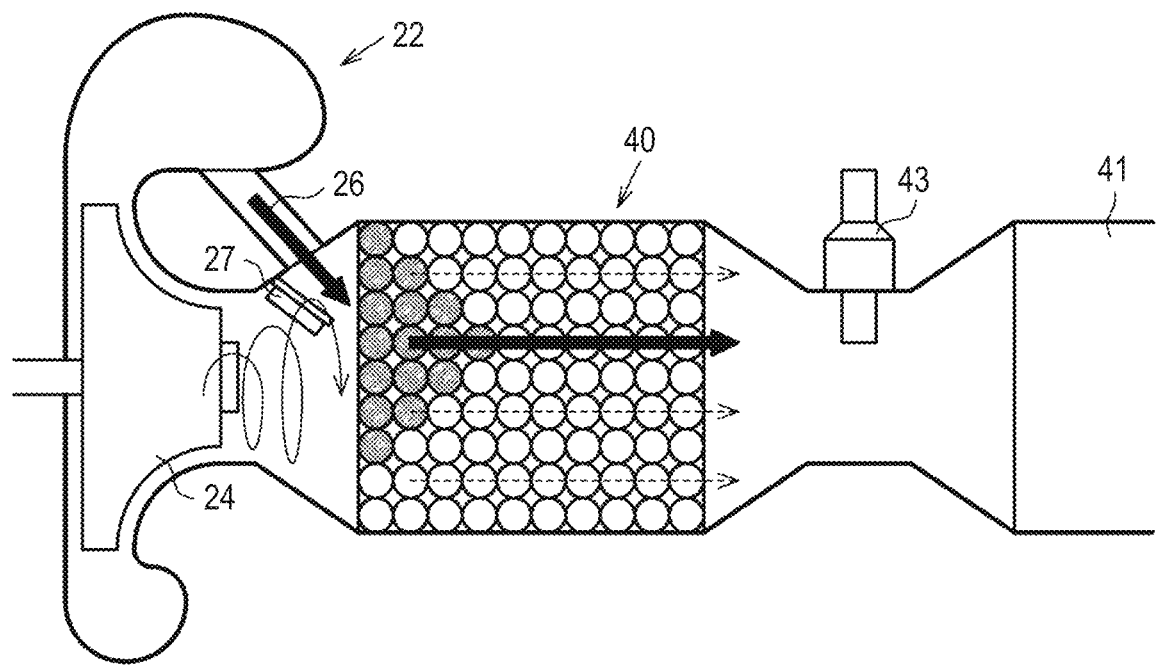
Figure 9:
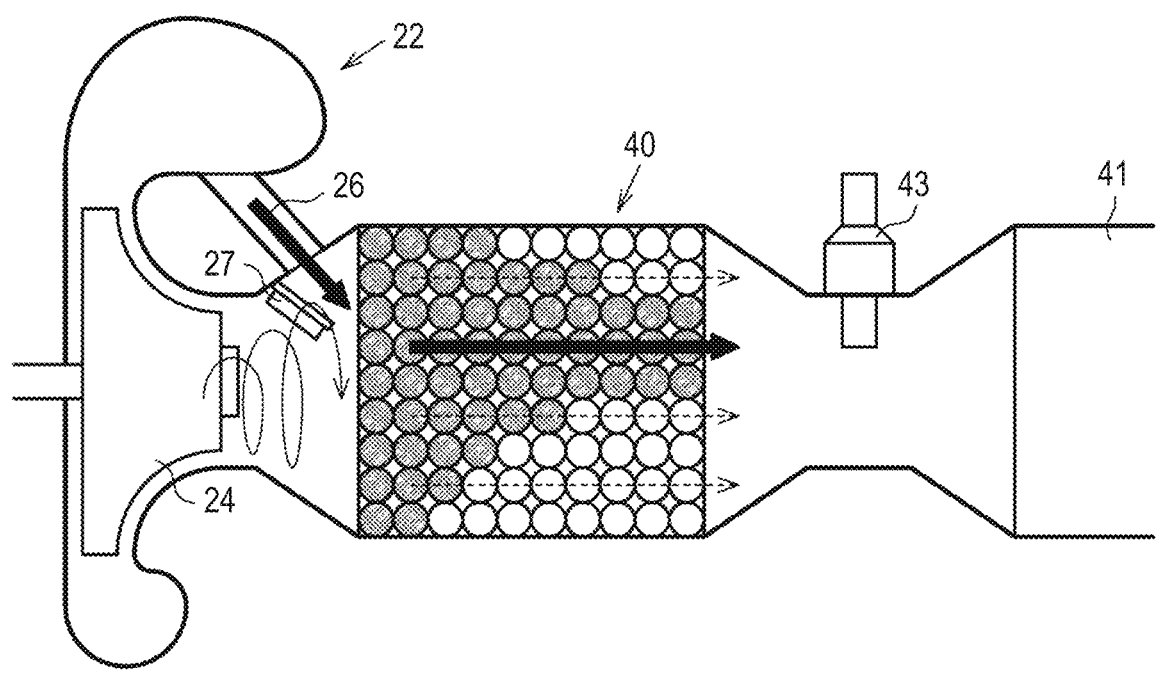
Figure 10:
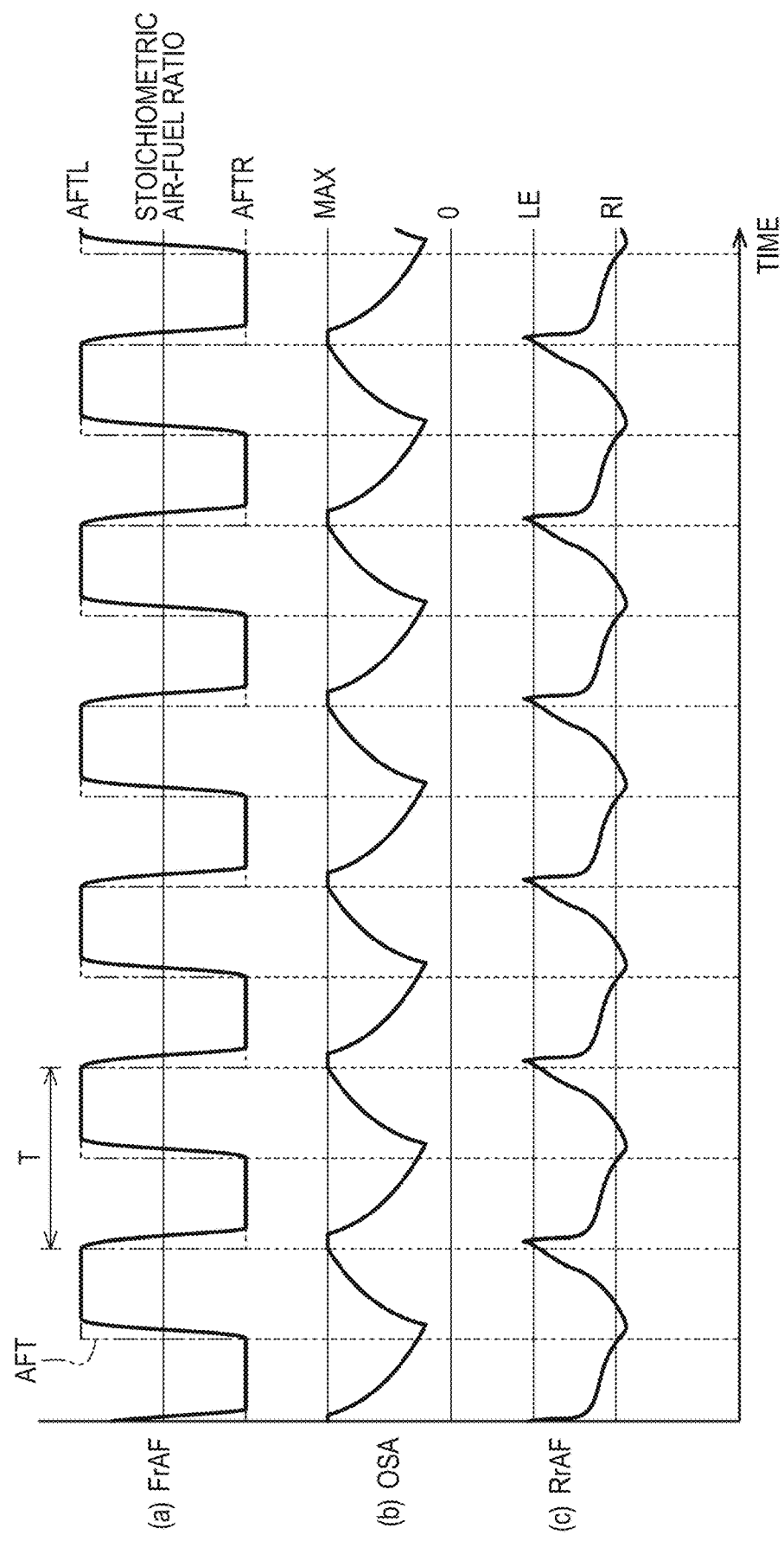

A portion (a) of FIG. 5 is a timing chart illustrating variation of a front air-fuel ratio and a target air-fuel ratio in air-fuel ratio control when a WGV is completely closed, a portion (b) of FIG. 5 is a timing chart illustrating variation of an amount of adsorbed oxygen, and a portion (c) of FIG. 5 is a timing chart illustrating variation of a rear air-fuel ratio;

FIG. 6 is a diagram illustrating an exhaust gas flow and an oxygen storage state of the front catalyst device immediately after rich combustion has started when the WGV is completely closed;

FIG. 7 is a diagram illustrating an exhaust gas flow and an oxygen storage state of the front catalyst device when the WGV is completely closed and a rich failure has occurred;

FIG. 8 is a diagram illustrating an exhaust gas flow and an oxygen storage state of the front catalyst device immediately after rich combustion has started when the WGV is fully open;

FIG. 9 is a diagram illustrating an exhaust gas flow and an oxygen storage state of the front catalyst device when the WGV is fully open and a rich failure has occurred;

A portion (a) of FIG. 10 is a timing chart illustrating variation of a front air-fuel ratio and a target air-fuel ratio in air-fuel ratio control when the WGV is fully open, a portion (b) of FIG. 10 is a timing chart illustrating variation of an amount of adsorbed oxygen, and a portion (c) of FIG. 10 is a timing chart illustrating variation of a rear air-fuel ratio;

FIG. 11 is a flowchart illustrating a routine of a limiting process which is performed by an engine control device according to a second embodiment;

FIG. 12 is a flowchart illustrating a routine of a limiting process which is performed by an engine control device according to a third embodiment; and FIG. 13 is a flowchart illustrating a routine of a limiting process which is performed by an engine control device according to a fourth embodiment.

DETAILED DESCRIPTION OF EMBODIMENTS

First Embodiment

Hereinafter, an engine control device according to a first embodiment will be described in detail with reference to FIGS. 1 to 12. The engine control device according to this embodiment is applied to an engine with a turbocharger which is mounted in a vehicle.

Configuration of Engine Control Device

Figure 1:
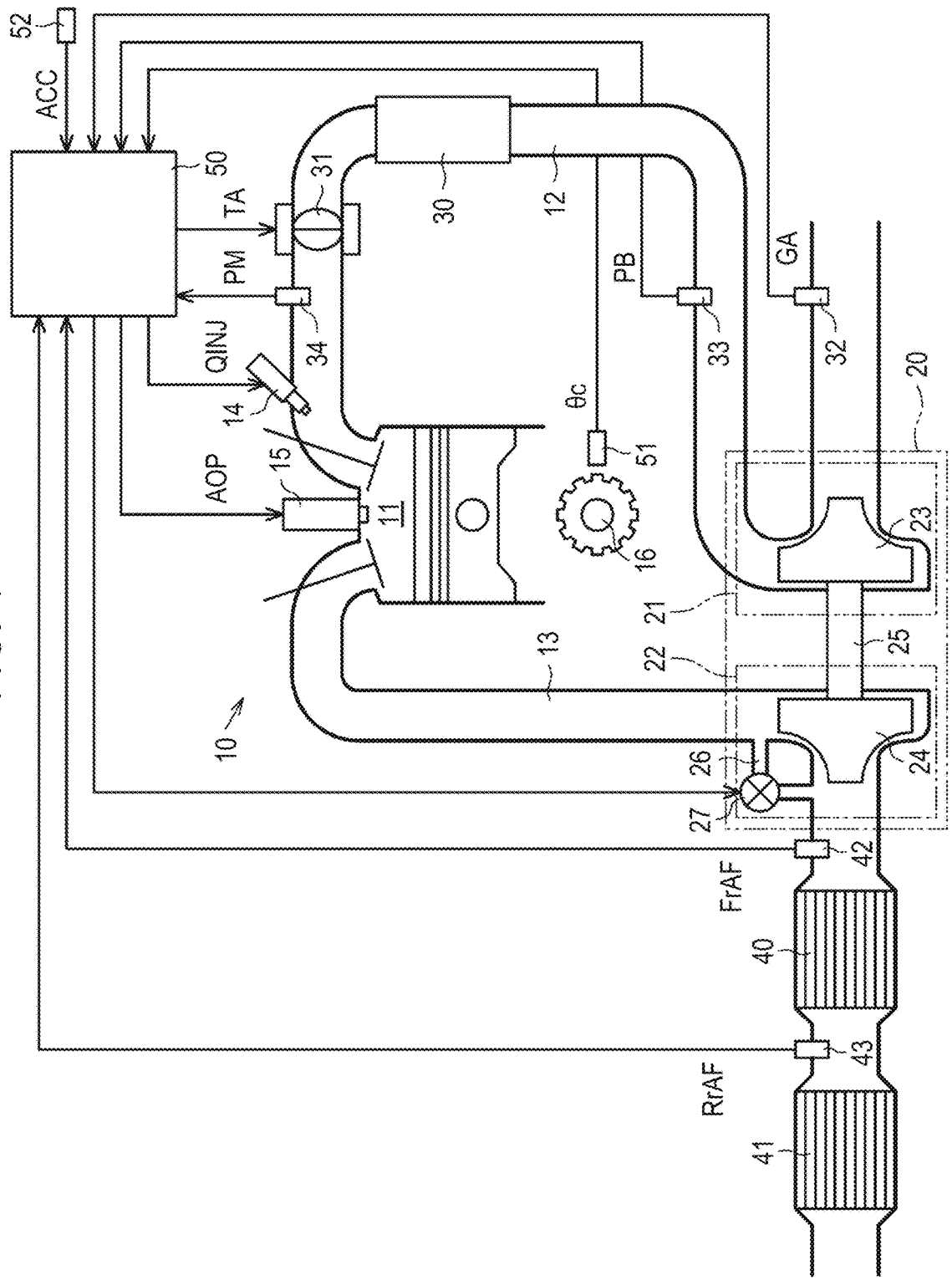
FIG. 1 is a diagram schematically illustrating a configuration of an engine control device according to a first embodiment.

A configuration of an engine 10 to which an engine control device 50 according to this embodiment is applied will be first described below with reference to FIG. 1. The engine 10 includes a combustion chamber 11 in which combustion of an air-fuel mixture is performed. The engine 10 includes an intake air passage 12 which is an introduction passage of intake air into the combustion chamber 11 and an exhaust passage 13 which is a discharge passage for exhaust gas from the combustion chamber 11. The engine 10 includes a plurality of cylinders and includes the combustion chamber 11 for each cylinder. Only one of a plurality of combustion chambers 11 is illustrated in FIG. 1. In the engine 10, an injector 14 that injects fuel into intake air provided for combustion in the combustion chamber 11 is provided for each cylinder. An ignition device 15 that ignites an air-fuel mixture in the combustion chamber 11 by spark discharge is provided in each cylinder of the engine 10. The engine 10 generates a driving force of a vehicle by rotating a crank shaft 16 by combustion of an air-fuel mixture in the combustion chamber 11.

The engine 10 includes a turbocharger 20. The turbocharger 20 includes a compressor 21 that is provided in the intake air passage 12 and a turbine 22 that is provided in the exhaust passage 13. A compressor wheel 23 that compresses intake air with its rotation is provided in the compressor 21. A turbine wheel 24 that rotates with a flow of exhaust gas applied thereto is provided in the turbine 22. The turbine wheel 24 is connected to the compressor wheel 23 via a turbine shaft 25. Accordingly, when the turbine wheel 24 rotates, the compressor wheel 23 also rotates together. A bypass passage 26 and a waste gate valve 27 are provided in the turbine 22. The bypass passage 26 is a flow passage for exhaust gas bypassing the turbine wheel 24. The waste gate valve 27 is a valve that changes a flow passage area for exhaust gas of the bypass passage 26. In this embodiment, a diaphragm valve that uses a pressure difference between a supercharging pressure PB and an atmospheric pressure for power for changing an opening level thereof is employed as the waste gate valve 27.

An intercooler 30 is provided in a part downstream from the compressor 21 in the intake air passage 12. A throttle valve 31 is provided in a part downstream from the intercooler 30 in the intake air passage 12. The intercooler 30 is a cooler that cools intake air which has been heated by adiabatic compression in the compressor 21 through exchange of heat with a coolant in the engine 10. The throttle valve 31 is a valve that changes a flow passage area of intake air in the intake air passage 12. An air flowmeter 32, a supercharging pressure sensor 33, and an intake manifold pressure sensor 34 are provided in the intake air passage 12. The air flowmeter 32 is provided in a part upstream from the compressor 21 in the intake air passage 12. The air flowmeter 32 detects an intake air flow rate GA which is a flow rate of intake air flowing in the intake air passage 12. The supercharging pressure sensor 33 detects a pressure of intake air in a part downstream from the intercooler 30 and upstream from the throttle valve 31 in the intake air passage 12 as a supercharging pressure PB. The intake manifold pressure sensor 34 detects a pressure of intake air in a part downstream from the throttle valve 31 in the intake air passage 12 as an intake manifold pressure PM.

A first catalyst device 40 is provided in a part downstream from the turbine 22 in the exhaust passage 13. A second catalyst device 41 is provided in a part downstream from the first catalyst device 40 in the exhaust passage 13. A three-way catalyst formed of a precious metal such as platinum is carried in the first catalyst device 40. The three-way catalyst is a catalyst material that simultaneously promotes oxidation of hydrocarbons (HC) and carbon monoxides (CO) which are unused fuel components in exhaust gas and reduction of nitrogen oxides (NOx) in the exhaust gas. An oxygen storage agent formed of metal oxides such as ceria is also carried in the first catalyst device 40. The oxygen storage agent stores nearby oxygen in an oxidation atmosphere in which oxygen is surplus and discharges a suddenly increased amount of oxygen in a reduction atmosphere in which oxygen is in deficit. The first catalyst device 40 in which the oxygen storage agent is carried is a catalyst device having an oxygen storage capability. Similarly to the first catalyst device 40, the second catalyst device 41 has a three-way catalyst carried therein and is a catalyst device having an oxygen storage capability.

A front air-fuel ratio sensor 42 and a rear air-fuel ratio sensor 43 are provided in the exhaust passage 13. The front air-fuel ratio sensor 42 is provided in a part downstream from the turbine 22 and upstream from the first catalyst device 40 in the exhaust passage 13. The rear air-fuel ratio sensor 43 is provided in a part downstream from the first catalyst device 40 and upstream from the second catalyst device 41 in the exhaust passage 13. The front air-fuel ratio sensor 42 includes a detection portion that is exposed to exhaust gas and outputs an electrical signal corresponding to a composition of exhaust gas which comes into contact with the detection portion. The output of the front air-fuel ratio sensor 42 corresponds to an air-fuel ratio of an air-fuel mixture combusted in the combustion chamber 11. In the following description, an air-fuel ratio indicated by the output of the front air-fuel ratio sensor 42 is referred to as a front air-fuel ratio FrAF.

On the other hand, the rear air-fuel ratio sensor 43 has the same structure as the front air-fuel ratio sensor 42. Here, the exhaust gas to which the detection portion of the rear air-fuel ratio sensor 43 is exposed is exhaust gas having passed through the first catalyst device 40. Accordingly, an air-fuel ratio indicated by the output of the rear air-fuel ratio sensor 43 has a value corresponding to a composition of exhaust gas which has been modified in the first catalyst device 40. In the following description, the air-fuel ratio indicated by the output of the rear air-fuel ratio sensor 43 is referred to as a rear air-fuel ratio RrAF. In this embodiment, the first catalyst device 40 corresponds to a catalyst device for exhaust emission control that is provided in a part downstream from the turbine 22 and upstream from the rear air-fuel ratio sensor 43 in the exhaust passage 13.

An engine control device 50 is mounted in a vehicle in which the engine 10 is mounted. The engine control device 50 is an electronic control unit including an operation processing circuit that performs various processes associated with engine control and a storage device that stores an engine control program and data.

The outputs of the air flowmeter 32, the supercharging pressure sensor 33, the intake manifold pressure sensor 34, the front air-fuel ratio sensor 42, and the rear air-fuel ratio sensor 43 are input to the engine control device 50. An output of a crank angle sensor 51 that detects a crank angle θc which is a rotation angle of the crank shaft 16 of the engine 10 and an output of an accelerator pedal sensor 52 that detects an acceleration pedal operation amount ACC which is an amount of depression of an accelerator pedal which is depressed by a driver are also input to the engine control device 50. The engine control device 50 calculates an engine rotation speed NE from the output of the crank angle sensor 51. The engine control device 50 calculates an engine load factor KL based on the intake air flow rate GA, the supercharging pressure PB, the intake manifold pressure PM, a throttle opening level TA, or the like. The engine load factor KL represents a filling factor ηc of intake air in the combustion chamber 11.

The engine control device 50 controls a throttle opening level TA, a fuel injection amount QINJ, an ignition timing AOP, or the like based on detection results from the sensors. The engine control device 50 controls a WGV opening level which is an opening level of the waste gate valve 27 according to an operation state of the engine 10. The engine control device 50 controls an air-fuel ratio of an air-fuel mixture combusted in the combustion chamber 11. The engine control device 50 performs fuel cutoff in which inject of fuel from the injector 14 stops temporarily while the vehicle is travel in a limp home mode such as at the time of deceleration.

Air-Fuel Ratio Control

Figure 2:
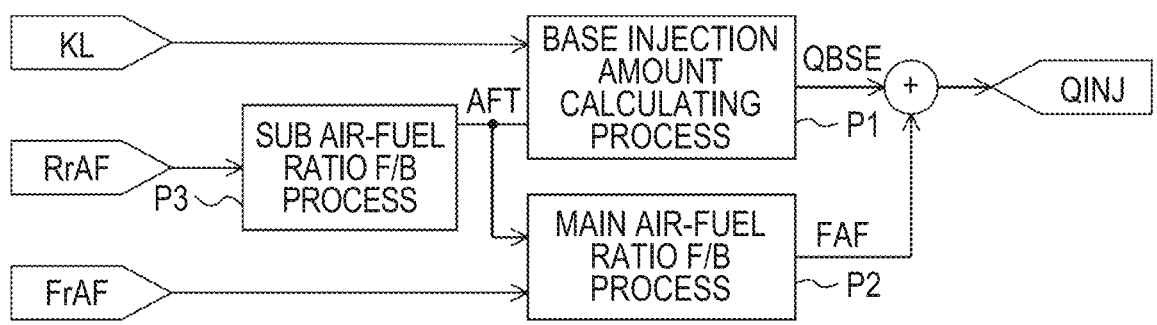
FIG. 2 is a control block diagram illustrating air-fuel ratio control which is performed by the engine control device.

Air-fuel ratio control will be described below with reference to FIG. 2. FIG. 2 illustrates a routine of processes which are performed by the engine control device 50 in association with air-fuel ratio control. As illustrated in FIG. 2, the engine control device 50 performs feedback control of an air-fuel ratio by setting the fuel injection amount QINJ of the injector 14 through a base injection amount calculating process P1, a main air-fuel ratio feedback process P2, and a sub air-fuel ratio feedback process P3. The engine control device 50 repeatedly performs a series of processes illustrated in FIG. 2 every prescribed control cycle while the engine 10 is operating. In the following description and the accompanying drawings, feedback is abbreviated to "F/B."

In the base injection amount calculating process P1, a value of the base injection amount QBSE is calculated based on the target air-fuel ratio AFT which is a target value of an air-fuel ratio and the engine load factor KL. Specifically, in the base injection amount calculating process P1, a quotient (=KL×ρ/AFT) obtained by dividing a product of a density ρ of intake air and the engine load factor KL by the target air-fuel ratio AFT is calculated as the value of the base injection amount QBSE.

In the main air-fuel ratio F/B process P2, an air-fuel ratio feedback correction value FAF which is a correction value of the fuel injection amount QINJ is calculated based on the front air-fuel ratio FrAF and the target air-fuel ratio AFT. Specifically, in the main air-fuel ratio F/B process P2, the value of the air-fuel ratio feedback correction value FAF is gradually updated such that a difference between the front air-fuel ratio FrAF and the target air-fuel ratio AFT approaches "0." In air-fuel ratio control, a product (=QBSE× FAF) of the base injection amount QBSE and the air-fuel ratio feedback correction value FAF is set as the value of the fuel injection amount QINJ of the injector 14.

In the sub air-fuel ratio F/B process P3, the target air-fuel ratio AFT is alternately switched between the rich-side target air-fuel ratio AFTR and the lean-side target air-fuel ratio AFTL. In the sub air-fuel ratio F/B process P3, a switching timing of the target air-fuel ratio AFT is determined based on the rear air-fuel ratio RrAF which is the output of the rear air-fuel ratio sensor 43. The value of the rich-side target air-fuel ratio AFTR is set to an air-fuel ratio which is slightly richer than a stoichiometric air-fuel ratio in advance. The value of the lean-side target air-fuel ratio AFTL is set to an air-fuel ratio which is slightly leaner than a stoichiometric air-fuel ratio in advance. Switching of the target air-fuel ratio AFT from the rich-side target air-fuel ratio AFTR to the lean-side target air-fuel ratio AFTL is performed when the rear air-fuel ratio RrAF has changed from an air-fuel ratio richer than a lean failure determination value LE to an air-fuel ratio leaner than the lean failure determination value LE. Switching of the target air-fuel ratio AFT from the lean-side target air-fuel ratio AFTL to the rich-side target air-fuel ratio AFTR is performed when the rear air-fuel ratio RrAF has changed from an air-fuel ratio leaner than a rich failure determination value RI to an air-fuel ratio richer than the rich failure determination value RI. The lean failure determination value LE is set to an air-fuel ratio leaner than the stoichiometric air-fuel ratio and richer than the lean-side target air-fuel ratio AFTL. The rich failure determination value RI is set to an air-fuel ratio which is richer than the stoichiometric air-fuel ratio and leaner than the rich-side target air-fuel ratio AFTR.

WGV Opening Level Control

The WGV opening level control which is performed by the engine control device 50 according to this embodiment will be described below. In the following description, an operation position of a valve body of the waste gate valve 27 in a state in which a flow passage area for exhaust gas of the bypass passage 26 is "0" is defined as an operation position at which the WGV opening level is "0." An amount of operation of the valve body of the waste gate valve 27 from the operation position at which the WGV opening level is "0" in a direction in which the flow passage area for exhaust gas of the bypass passage 26 is enlarged is defined as a value of the WGV opening level.

Figure 3:
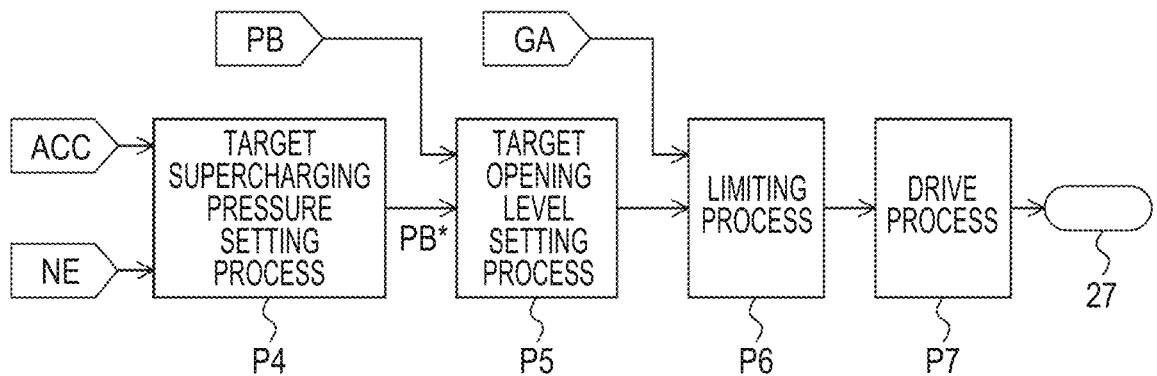
FIG. 3 is a control block diagram illustrating WGV opening level control which is performed by the engine control device.

FIG. 3 illustrates a routine of processes which are performed by the engine control device 50 in association with WGV opening level control. As illustrated in FIG. 3, the engine control device 50 performs the WGV opening level control through a target supercharging pressure setting process P4, a target opening level setting process P5, a limiting process P6, and a drive process P7. The engine control device 50 repeatedly performs a series of processes illustrated in FIG. 3 every prescribed control cycle while the engine 10 is operating.

In the target supercharging pressure setting process P4, a target supercharging pressure PB* which is a target value of the supercharging pressure PB is set based on the engine rotation speed NE and the acceleration pedal operation amount ACC. In the target opening level setting process P5, a value of a target WGV opening level which is a target value of the WGV opening level is set based on the target supercharging pressure PB* and a current supercharging pressure PB. The value of the target WGV opening level is set in a range which is equal to or greater than "0" and which is equal to or less than a maximum opening level which is a maximum value of a change range of the WGV opening level such that the supercharging pressure PB approaches the target supercharging pressure PB*. That is, when a current supercharging pressure PB is lower than the target supercharging pressure PB*, the value of the target WGV opening level is set such that the WGV opening level increases in a range equal to or less than the maximum opening level. When the current supercharging pressure PB is higher than the target supercharging pressure PB*, the value of the target WGV opening level is set such that the WGV opening level decreases in a range equal to or greater than "0." When the current supercharging pressure PB is equal to the target supercharging pressure PB*, the current WGV opening level is set as the value of the target WGV opening level without any change.

The value of the target WGV opening level set in the target opening level setting process P5 is sent to the drive process P7 via the limiting process P6. In the drive process P7, drive control of the waste gate valve 27 is performed such that the WGV opening level is changed to the value of the target WGV opening level sent via the limiting process P6.

Figure 4:
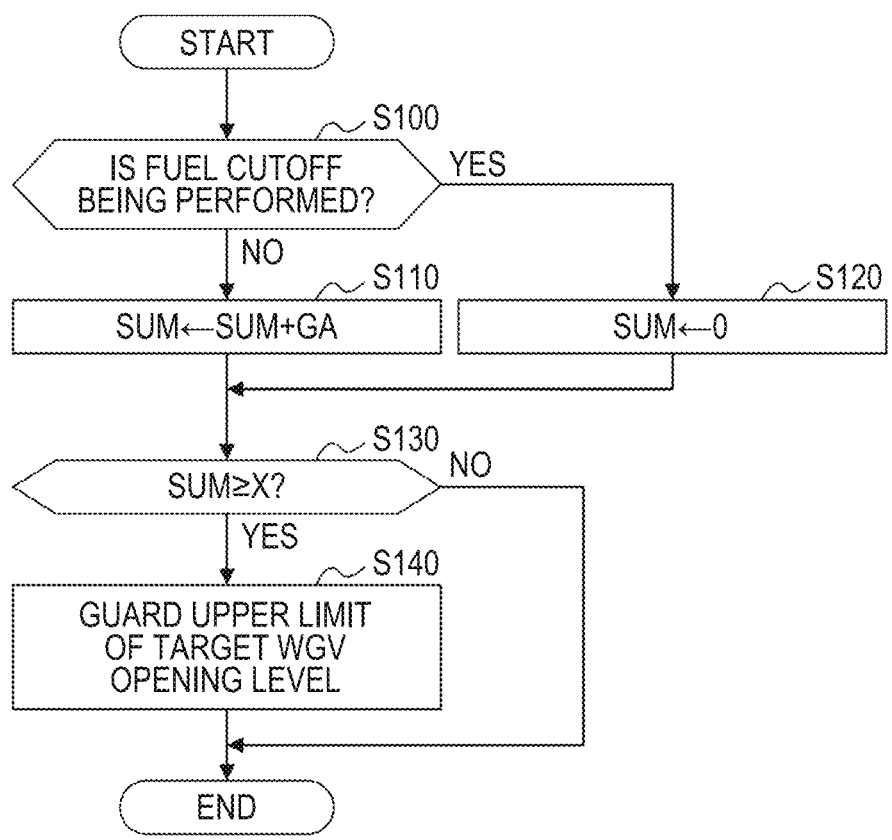
FIG. 4 is a flowchart illustrating a routine of a limiting process which is performed at the time of WGV opening level control by the engine control device.

FIG. 4 illustrates a routine of processes which are performed by the engine control device 50 in association with the limiting process P6. In the drive process P7, first, the engine control device 50 determines whether the engine 10 is performing fuel cutoff in Step S100. When the engine 10 is not performing fuel cutoff (NO), the engine control device 50 updates a value of a total intake air flow rate SUM such that a sum obtained by adding the current intake air flow rate GA to the pre-update value is an updated value in Step S110, and then causes the routine to proceed to the process of Step S130. On the other hand, when the engine 10 is performing fuel cutoff (YES), the engine control device 50 clears the value of the total intake air flow rate SUM to "0" in Step S120 and then causes the routine to proceed to the process of Step S130. The value of the total intake air flow rate SUM represents a total value of the intake air flow rate GA in a period in which the combustion operation of the engine 10 continues to be performed without being stopped by fuel cutoff.

When the routine proceeds to the process of Step S130, the engine control device 50 determines whether the value of the total intake air flow rate SUM is equal to or greater than a prescribed determination value X in Step S130. When the total intake air flow rate SUM is less than the determination value X (NO), the engine control device 50 ends the limiting process P6 in this control cycle without performing any other process. In this case, the value of the target WGV opening level set in the target opening level setting process P5 is sent to the drive process P7 without any change. On the other hand, when the total intake air flow rate SUM is equal to or greater than the determination value X (YES), the engine control device 50 causes the routine to proceed to the process of Step S140. In Step S140, the engine control device 50 performs upper limit guarding on the value of the target WGV opening level such that it is an opening level equal to or lower than a prescribed opening level limit, and then ends the limiting process P6 in this control cycle. A value which is equal to or greater than "0" and less than a maximum opening level is set in advance as the opening level limit. In this case, when the value of the target WGV opening level set in the target opening level setting process P5 is less than the opening level limit, the value is sent as the value of the target WGV opening level to the drive process P7 without any change. On the other hand, when the value of the target WGV opening level set in the target opening level setting process P5 is equal to or greater than the opening level limit, the opening level limit is sent as the value of the target WGV opening level to the drive process P7. That is, when the total intake air flow rate SUM is equal to or greater than the determination value X, an upper limit of a control range of the WGV opening level is decreased from the maximum opening level to the opening level limit. In the following description, the decrease of the upper limit of the control range of the WGV opening level from the maximum opening level to the opening level limit is referred to as opening level limiting of the waste gate valve 27.

Operations and Advantages of Embodiment

The operations and advantages of this embodiment will be described below.

FIG. 5 illustrates an example of air-fuel ratio control which is performed by the engine control device 50 according to this embodiment. In FIG. 5, a situation in which the engine 10 is operating steadily in a state in which the waste gate valve 27 is completely closed is illustrated. A portion (a) of FIG. 5 illustrates changes of the front air-fuel ratio FrAF and a target air-fuel ratio AFT, a portion (b) of FIG. 5 illustrates variation of an oxygen storage amount OSA of the first catalyst device 40, and a portion (c) of FIG. 5 illustrates variation of the rear air-fuel ratio RrAF.

When the lean-side target air-fuel ratio AFTL is set as the value of the target air-fuel ratio AFT, combustion of an air-fuel mixture in the combustion chamber 11 is performed at an air-fuel ratio leaner than the stoichiometric air-fuel ratio. In the following description, combustion of an air-fuel mixture at the stoichiometric air-fuel ratio is referred to as stoichiometric combustion, combustion of an air-fuel mixture at an air-fuel ratio leaner than the stoichiometric air-fuel ratio is referred to as lean combustion, and combustion of an air-fuel mixture at an air-fuel ratio richer than the stoichiometric air-fuel ratio is referred to as rich combustion. In the following description, exhaust gas including the same amount of oxygen as an amount required for completely combusting an unused fuel component in exhaust gas is referred to as stoichiometric exhaust gas. In the following description, exhaust gas including a larger amount of oxygen than the amount required for completely combusting an unused fuel component in exhaust gas is referred to as lean exhaust gas. In the following description, exhaust gas including a smaller amount of oxygen than the amount required for completely combusting an unused fuel component in exhaust gas is referred to as rich exhaust gas. Exhaust gas which is generated by stoichiometric combustion is the stoichiometric exhaust gas, exhaust gas which is generated by lean combustion is the lean exhaust gas, and exhaust gas which is generated by rich combustion is the rich exhaust gas.

In the lean combustion, the lean exhaust gas flows into the first catalyst device 40. The first catalyst device 40 at this time reduces and clears NOx in the exhaust gas by storing surplus oxygen in the exhaust gas. As a result, exhaust gas flowing out of the first catalyst device 40 has a composition close to that of the stoichiometric exhaust gas. Accordingly, the rear air-fuel ratio RrAF at this time has a value close to the stoichiometric air-fuel ratio.

Here, an amount of oxygen which can be stored in the first catalyst device 40 is limited. Accordingly, when the lean combustion continues to be performed, the oxygen storage amount OSA of the first catalyst device 40 reaches an upper limit MAX thereof finally and thus cannot store oxygen any more. Lean exhaust gas flows out of the first catalyst device 40. In the following description, the state in which lean exhaust gas flows out of the first catalyst device 40 is referred to as a lean failure state. When a lean failure occurs, exhaust gas flowing in the vicinity of the detection portion of the rear air-fuel ratio sensor 43 is lean exhaust gas. Accordingly, the rear air-fuel ratio RrAF at this time is an air-fuel ratio leaner than the stoichiometric air-fuel ratio.

The engine control device 50 ascertains occurrence of a lean failure when the rear air-fuel ratio RrAF has a value leaner than the lean failure determination value LE during lean combustion. When occurrence of a lean failure is ascertained, the engine control device 50 switches the target air-fuel ratio AFT from the lean-side target air-fuel ratio AFTL to the rich-side target air-fuel ratio AFTR. Accordingly, combustion in the combustion chamber 11 is switched from lean combustion to rich combustion. In FIG. 4, switching from lean combustion to rich combustion due to a lean failure is performed at times t2, t4, and t6.

When rich combustion is started, rich exhaust gas flows into the first catalyst device 40. The first catalyst device 40 at this time oxidizes and clears an unused fuel component in exhaust gas by discharging oxygen stored in lean combustion. As a result, exhaust gas discharged from the first catalyst device 40 has a composition close to that of the stoichiometric exhaust gas. Accordingly, the rear air-fuel ratio RrAF has a value close to the stoichiometric air-fuel ratio again.

When the rich combustion continues to be performed, the oxygen storage amount OSA of the first catalyst device 40 becomes "0" finally and an unused fuel component cannot be satisfactorily oxidized. As a result, rich exhaust gas flows out of the first catalyst device 40 and the rear air-fuel ratio RrAF changes from a value close to the stoichiometric air-fuel ratio to a rich side. In the following description, a state in which rich exhaust gas flows out of the first catalyst device 40 in this way is referred to as a rich failure state.

The engine control device 50 ascertains occurrence of a rich failure when the rear air-fuel ratio RrAF has a value richer than the rich failure determination value RI during rich combustion. When occurrence of a rich failure is ascertained, the engine control device 50 switches the target air-fuel ratio AFT from the rich-side target air-fuel ratio AFTR to the lean-side target air-fuel ratio AFTL and starts lean combustion. Thereafter, whenever occurrence of a lean failure and a rich failure is ascertained, the combustion is alternately switched between lean combustion and rich combustion. In FIG. 4, switching from rich combustion to lean combustion due to a rich failure is performed at times t1, t3, t5, and t7.

When a lean failure occurs, an amount of NOx discharged from the first catalyst device 40 increases temporarily. When a rich failure occurs, an amount of THC discharged from the first catalyst device 40 increases temporarily. The amount of discharged THC is acquired by totaling an amount of discharged methane and an amount of discharged non-methane hydrocarbons. In addition, the second catalyst device 41 serves to remove CO, HC, and NOx which could not be all removed by the first catalyst device 40.

As described above, the engine control device 50 performs air-fuel ratio control through two feedback processes including the main air-fuel ratio F/B process P2 based on the output of the front air-fuel ratio sensor 42 and the sub air-fuel ratio F/B process P3 based on the output of the rear air-fuel ratio sensor 43. Through such air-fuel ratio control, emission performance of the engine 10 is secured.

On the other hand, in the engine 10, the first catalyst device 40 is provided in a part downstream from the turbine 22 in the exhaust passage 13. The bypass passage 26 that allows exhaust gas to bypass the turbine wheel 24 and the waste gate valve 27 that changes the flow passage area for exhaust gas of the bypass passage 26 are provided in the turbine 22. In this engine 10, the method in which exhaust gas comes into contact with the first catalyst device 40 changes depending on the opening level of the waste gate valve 27. Emission performance of the engine 10 may deteriorate due to the change.

FIG. 6 illustrates a flow of exhaust gas flowing into the first catalyst device 40 when the waste gate valve 27 is completely closed. In the following description, an upstream end in the flow direction of exhaust gas of the first catalyst device 40 is defined as a front end of the first catalyst device 40. A downstream end in the flow direction of exhaust gas of the first catalyst device 40 is defined as a rear end of the first catalyst device 40.

At this time, since the bypass passage 26 is closed, all exhaust gas discharged from the combustion chamber 11 reaches the first catalyst device 40 via the turbine wheel 24. The flow of exhaust gas becomes a swirl flow as illustrated in FIG. 7 by passing through the turbine wheel 24. Accordingly, a bias of contact of exhaust gas with a front end face of the first catalyst device 40 decreases. That is, exhaust gas comes into uniform contact with the front end face of the first catalyst device 40.

FIG. 6 and FIGS. 7 to 9 which will be described later illustrate an oxygen storage state for each site of the first catalyst device 40. Sites indicated by white circles in the drawings are sites in which an oxygen storage agent stores oxygen. Sites indicated by hatched circles in the drawings are sites in which an oxygen storage agent stores oxygen. FIG. 6 illustrates an oxygen storage state of the first catalyst device 40 immediately after lean combustion has been switched to rich combustion with occurrence of a lean failure. FIG. 7 illustrates the oxygen storage state of the first catalyst device 40 when a rich failure has occurred thereafter.

As described above, when the waste gate valve 27 completely closed, exhaust gas comes into uniform contact with the whole front end face of the first catalyst device 40 and thus discharge of oxygen from the oxygen storage agent after rich combustion has been started is uniformly performed from the front end to the rear end of the first catalyst device 40. Accordingly, as illustrated in FIG. 8, the first catalyst device 40 when a rich failure has occurred is in a state in which almost all oxygen stored in lean combustion has been discharged, that is, a state in which the oxygen storage amount OSA is almost zero. Similarly, storage of oxygen in lean combustion is uniformly performed from the front end to the rear end of the first catalyst device 40. Accordingly, the first catalyst device 40 when a lean failure has occurred is in a state in which oxygen is stored to the limit, that is, a state in which the oxygen storage amount OSA reaches an upper limit MAX.

FIG. 8 illustrates a flow of exhaust gas flowing into the first catalyst device 40 when the waste gate valve 27 is fully open. Since a pressure loss of exhaust gas in a path passing through the turbine wheel 24 is greater than that in the bypass passage 26, most of exhaust gas discharged from the combustion chamber 11 at that time reaches the first catalyst device 40 via the bypass passage 26. At this time, as illustrated in FIG. 8, a strong blow-down flow blowing out from the bypass passage 26 comes into contact with a limited range of the front end face of the first catalyst device 40. Accordingly, a part in which a large amount of exhaust gas flows and a part in which only a small amount of exhaust gas flows are formed in the first catalyst device 40 at that time.

FIG. 8 illustrates the oxygen storage state of the first catalyst device 40 immediately after lean combustion has been switched to rich combustion with occurrence of a lean failure. FIG. 9 illustrates the oxygen storage state of the first catalyst device 40 when a rich failure has occurred thereafter. Oxygen discharged from the first catalyst device 40 at this time is concentrated in a site in which a large amount of exhaust gas flows. Accordingly, a rich failure occurs at this time in a state in which a site having oxygen stored therein is left in the first catalyst device 40 as illustrated in FIG. 9.

FIG. 10 illustrates an example of the air-fuel ratio control when the engine 10 is operating steadily in a state in which the waste gate valve 27 is fully open. A portion (a) of FIG. 10 illustrates variation of the front air-fuel ratio FrAF and the target air-fuel ratio AFT, a portion (b) of FIG. 10 illustrates variation of the oxygen storage amount OSA of the first catalyst device 40, and a portion (c) of FIG. 10 illustrates variation of the rear air-fuel ratio RrAF.

In this case, a lean failure occurs before the oxygen storage amount OSA of the first catalyst device 40 decreases to "0." Accordingly, a period from start of lean combustion to occurrence of a lean failure is shorter than that in FIG. 5. Since the rich combustion is started in a state in which the oxygen storage amount OSA has not decreased to "0," the period from start of rich combustion to occurrence of a rich failure is also shorter than that in FIG. 5. Accordingly, an occurrence period T of the lean failure and the rich failure is shorter when the waste gate valve 27 is fully open than when the waste gate valve 27 is completely closed.

When a flow rate of exhaust gas discharged from the combustion chamber 11 is constant, the flow rate of exhaust gas in the bypass passage 26 increases as the WGV opening level increases. That is, as the WGV opening level becomes higher, a blow-down flow of exhaust gas from the bypass passage 26 to the first catalyst device 40 becomes stronger and a bias of a flow of exhaust gas in the first catalyst device 40 increases. Accordingly, when the WGV opening level is high, an occurrence period T of a lean failure and a rich failure is shorter than that when the WGV opening level is low. When the occurrence period T decreases, an occurrence frequency of a lean failure and a rich failure increases. On the other hand, as described above, an amount NOx discharged from the first catalyst device 40 increases temporarily when a lean failure occurs, and an amount of THC discharged from the first catalyst device 40 increases temporarily when a rich failure occurs. Accordingly, when the occurrence period T of a lean failure and a rich failure decreases with an increase in WGV opening level, emission performance of the engine 10 is likely to deteriorate. Here, the engine 10 is designed such that the amount of discharged NOx and the amount of discharged THC stay in allowable ranges even when the occurrence period T of a lean failure and a rich failure decreases with an increase in WGV opening level.

As described above, in the engine control device 50 according to this embodiment, combustion in the engine 10 is alternately switched between rich combustion and lean combustion in the air-fuel ratio control. Rich exhaust gas including hydrocarbons (HC) or sulfur oxides (SOx) which are unused fuel components flows into the first catalyst device 40 in rich combustion. On the other hand, as described above, a precious metal serving as a three-way catalyst is carried in the first catalyst device 40. In the first catalyst device 40 in rich combustion, a sulfur component in exhaust gas is adsorbed on the precious metal. Hydrocarbons in exhaust gas are adsorbed on the precious metal with an acidic surface due to adsorption of the sulfur component. Some of the adsorbed hydrocarbons are polymerized into higher hydrocarbons and coat the surface of the precious metal, whereby a catalytic reaction of the precious metal is inhibited.

When fuel cutoff is performed and a large amount of oxygen flows into the first catalyst device 40, the higher hydrocarbons with the surface of the precious metal is coated are oxidized and removed from the surface of the precious metal. Accordingly, when fuel cutoff is performed in a higher frequency than a prescribed frequency, coating of the surface of the precious metal with higher hydrocarbons does not progress until an exhaust emission control capability of the first catalyst device 40 decreases. When a vehicle is traveling on a flat automobile road almost without undulation, or the like, fuel cutoff may not be performed for a long time. In this case, the exhaust emission control capability of the first catalyst device 40 is decreased due to coating of the surface of the precious metal with higher hydrocarbons. At this time, when shortening of an occurrence period T of a lean failure and a rich failure due to an increase in WGV opening level overlaps, the amount of discharged NOx and the amount of discharged THC may increase over an allowable range.

On the other hand, in the engine control device 50 according to this embodiment, whether the combustion operation of the engine 10 continues to be performed for a long time without being stopped due to fuel cutoff is determined based on the total intake air flow rate SUM. When the combustion operation continues to be performed for a long time, the opening level of the waste gate valve 27 is limited. That is, the upper limit of the control range of the WGV opening level is decreased from the maximum opening level to the opening level limit. Accordingly, the WGV opening level does not increase over the opening level limit. As a result, shortening of the occurrence period T of a lean failure and a rich failure is not likely to occur with an increase in WGV opening level. Accordingly, even when the exhaust emission control capability of the first catalyst device 40 has been temporarily decreased due to coating with higher hydrocarbons, emission performance is not likely to deteriorate.

With the aforementioned engine control device 50 according to this embodiment, it is possible to achieve the following advantages.

(1) In this embodiment, when the combustion operation of the engine 10 continues to be performed for a long time without being stopped due to fuel cutoff, the limiting process P6 of setting the upper limit of the control range of the WGV opening level to be less than that otherwise is performed. Accordingly, even when the exhaust emission control capability of the first catalyst device 40 has been temporarily decreased due to coating with higher hydrocarbons, emission performance is not likely to deteriorate.

(2) An amount of higher hydrocarbons which are generated in the first catalyst device 40 to coat the surface of a precious metal also increases as an amount of unused fuel components flowing into the first catalyst device 40 increases. A flow rate of unused fuel components flowing into the first catalyst device 40 increases as an exhaust gas flow rate increases and as an intake air flow rate GA increases. Accordingly, the total intake air flow rate SUM which is a total value of the intake air flow rate GA has a high correlation with a degree of progress of coating with higher hydrocarbons. In this embodiment, whether the combustion operation of the engine 10 continues to be performed for a long time without being stopped is determined based on the total intake air flow rate SUM in the period in which the combustion operation continues to be performed. Accordingly, it is possible to perform limiting of the opening level of the waste gate valve 27 in the limiting process P6 at an appropriate timing.

Second Embodiment

An engine control device 50 according to a second embodiment will be described below in detail with additional reference to FIG. 11. The configuration of the engine control device 50 according to this embodiment is the same as the configuration in the first embodiment except details of the limiting process P6. In this embodiment and embodiments which will be described later, the same elements as in the aforementioned embodiment will be referred to by the same reference signs and detailed description thereof will not be repeated.

FIG. 11 illustrates a process routine associated with the limiting process P6 in the engine control device 50 according to this embodiment. The processes of Steps S100 to S140 in FIG. 11 are the same as the processes of Steps S100 to S140 in FIG. 4.

In the engine control device 50 according to this embodiment, before the limiting process P6, it is determined in Step S10 whether a state in which fluctuation of the engine load factor KL is small is maintained in a prescribed period up to a current time. That is, in Step S10, it is determined whether fluctuation in load of the engine 10 is small. When the fluctuation in load of the engine 10 is not small (NO), the routine illustrated in FIG. 11 ends without performing the limiting process P6 in the current control cycle. In this case, the value of the target WGV opening level set in the target opening level setting process P5 is handed over to the drive process P7 without any change. On the other hand, when the fluctuation in load of the engine 10 is small (S10: YES), the routine proceeds to Step S100. Thereafter, the limiting process P6 is performed similarly to the case illustrated in FIG. 4. That is, in this embodiment, the limiting process P6 is performed based on the premise that the fluctuation in load of the engine 10 is small. In this embodiment, when the fluctuation in load of the engine 10 is small and the total intake air flow rate SUM is equal to or greater than a determination value X, limiting of the opening level of the waste gate valve 27 is performed.

As described above, when the combustion operation of the engine 10 continues to be performed for a long time without being stopped due to fuel cutoff, the exhaust emission control capability of the first catalyst device 40 is decreased due to coating with higher hydrocarbons. When fuel cutoff is not performed and the engine load factor KL changes greatly, exhaust gas flowing into the first catalyst device 40 in the course of change thereof temporarily becomes lean exhaust gas. Some of higher hydrocarbons with which the surface of the precious metal is coated are oxidized and removed from the surface of the precious metal. Accordingly, when the combustion operation of the engine 10 continues to be performed for a long time without being stopped due to fuel cutoff and the engine load factor KL has changed greatly immediately before, the exhaust emission control capability of the first catalyst device 40 is recovered to a certain extent. In this embodiment, limiting of the opening level of the waste gate valve 27 is not performed in this case. Accordingly, in a state in which the exhaust emission control capability of the first catalyst device 40 is not decreased much, limiting of the opening level of the waste gate valve 27 in the limiting process P6 is not likely to be unnecessarily performed.

Third Embodiment

An engine control device 50 according to a third embodiment will be described below in detail with additional reference to FIG. 12. The engine control device 50 according to this embodiment is mounted in a vehicle in which cruise control for automatically operating an accelerator to maintain a vehicle speed at a preset speed can be performed.

FIG. 12 illustrates a process routine associated with the limiting process P6 in the engine control device 50 according to this embodiment. The processes of Steps S100 to S140 in FIG. 12 are the same as the processes of Steps S100 to S140 in FIG. 4.

In the engine control device 50 according to this embodiment, before the limiting process P6, it is determined in Step S20 whether cruise control is being performed. When cruise control is not being performed (NO), the routine illustrated in FIG. 12 ends without performing the limiting process P6 in the current control cycle. On the other hand, when cruise control is being performed (YES), the limiting process P6 is performed similarly to the case illustrated in FIG. 4 thereafter. That is, in this embodiment, the limiting process P6 is performed based on the premise that cruise control is being performed. In this embodiment, when cruise control is being performed and the total intake air flow rate SUM is equal to or greater than a determination value X, limiting of the opening level of the waste gate valve 27 is performed.

In cruise control, output control of the engine 10 is performed such that the engine load factor KL changes smoothly. On the other hand, when a driver is operating an accelerator pedal, the engine load factor KL is likely to change more roughly in consideration of the case in which cruise control is being performed. In this embodiment, it is assumed that the exhaust emission control performance of the first catalyst device 40 rarely decreases due to coating with higher hydrocarbons except for a case in which cruise control is being performed. That is, when a driver is operating an accelerator pedal, it is assumed that the engine load factor KL changes to an extent at which the exhaust emission control performance of the first catalyst device 40 having decreased due to coating with higher hydrocarbons is recovered. Accordingly, in this embodiment, limiting of the opening level of the waste gate valve 27 in the limiting process P6 is performed based on the premise that the combustion operation of the engine 10 continues to be performed for a long time without being stopped due to fuel cutoff and automatic cruise is being performed.

When the combustion is switched between rich combustion and lean combustion in the sub air-fuel ratio F/B process P3, the torque of the engine 10 changes. When the torque of the engine 10 changes, the vehicle speed also changes. On the other hand, when the occurrence period T of lean failure and rich failure is shortened with an increase of the WGV opening level, the period of torque change with the combustion switching is also shortened. Accordingly, when the WGV opening level increases while performing cruise control, controllability of the vehicle speed becomes worse. Accordingly, when the opening level of the waste gate valve 27 is limited through the limiting process P6, controllability of the vehicle speed in cruise control is not likely to be worse.

Fourth Embodiment

An engine control device 50 according to a fourth embodiment will be described below in detail with additional reference to FIG. 13. The configuration of the engine control device 50 according to this embodiment is the same as that in the first embodiment except for details of the limiting process P6.

FIG. 13 illustrates a process routine associated with the limiting process P6 in the engine control device 50 according to this embodiment. The processes of Steps S100 to S140 in FIG. 13 are the same as the processes of Steps S100 to S140 in FIG. 4.

In the engine control device 50 according to this embodiment, before the limiting process P6, it is determined in Step S30 whether the first catalyst device 40 has deteriorated. When the first catalyst device 40 has not deteriorated (NO), the routine illustrated in FIG. 13 ends without performing the limiting process P6 in the current control cycle. On the other hand, when the first catalyst device 40 has deteriorated (YES), the limiting process P6 is performed similarly to the case illustrated in FIG. 4 thereafter. That is, in this embodiment, the limiting process P6 is performed based on the premise that the first catalyst device 40 has deteriorated. In this embodiment, when the first catalyst device 40 has deteriorated and the total intake air flow rate SUM is equal to or greater than a determination value X, limiting of the opening level of the waste gate valve 27 is performed.

In this embodiment, whether the first catalyst device 40 has deteriorated is determined as follows. The engine control device 50 calculates an oxygen storage capacity which is a maximum value of an amount of oxygen which can be stored by the first catalyst device 40. Then, the engine control device 50 determines that the oxygen storage capability of the first catalyst device 40 has decreased with the decrease of the oxygen storage capacity. The oxygen storage capacity of the first catalyst device 40 is calculated, for example, by calculating an amount of oxygen stored in the first catalyst device 40 in a period from start of lean combustion to occurrence of a lean failure based on the front air-fuel ratio FrAF and the intake air flow rate GA in the period. That is, in this embodiment, a state in which the oxygen storage capability of the first catalyst device 40 has decreased is defined as a state in which the first catalyst device 40 has deteriorated.

When the oxygen storage capability of the first catalyst device 40 decreases due to deterioration, the occurrence period T of a lean failure and a rich failure is shortened. When the WGV opening level increases in this state, the occurrence period T may be further shortened and emission may deteriorate. In this embodiment, when the oxygen storage capability of the first catalyst device 40 has decreased, limiting of the opening level of the waste gate valve 27 is performed. Accordingly, deterioration of emission is curbed by avoiding overlap shortening of the occurrence period T due to the decrease of the oxygen storage capability and shortening of the occurrence period T due to the increase of the WGV opening level.

OTHER EMBODIMENTS

The aforementioned embodiments can be modified as follows. These embodiments and the following modified examples can be combined unless technical conflictions arise.

Limiting of the opening level of the waste gate valve 27 in the limiting process P6 according to the second embodiment may be performed when at least one of a condition that the total intake air flow rate SUM is equal to or greater than the determination value X and a condition that a state in which the change of the engine load factor KL is small is maintained is satisfied.

Limiting of the opening level of the waste gate valve 27 in the limiting process P6 according to the third embodiment may be performed when at least one of a condition that the total intake air flow rate SUM is equal to or greater than the determination value X and a condition that cruise control is being performed is satisfied.

Limiting of the opening level of the waste gate valve 27 in the limiting process P6 according to the fourth embodiment may be performed when at least one of a condition that the total intake air flow rate SUM is equal to or greater than the determination value X and a condition that the first catalyst device 40 has deteriorated is satisfied.

In the aforementioned embodiments, whether the combustion operation of the engine 10 continues to be performed for a long time without being stopped is determined based on the total intake air flow rate SUM. This determination may be performed based on the following parameters in the period in which the combustion operation of the engine 10 continues to be performed without being stopped due to fuel cutoff. That is, examples of the parameters include a total value of the fuel injection amount QINJ, a total value of an exhaust gas flow rate, a travel distance of a vehicle, and a time.

In the aforementioned embodiments, the value of the opening level limit is fixed, but may be set to be variable depending on the total intake air flow rate SUM or the like. For example, when the total intake air flow rate SUM increases from the determination value X, the value of the opening level limit is set to a value which decreases continuously or stepwise with an increase of the total intake air flow rate SUM from the value at which the total intake air flow rate SUM is the determination value X. In this case, the range of the value of the opening level limit is a range which is equal to or greater than "0" and less than a maximum opening level.

In the aforementioned embodiments, limiting of the opening level of the waste gate valve 27 is performed by guarding the upper limit of the value of the target WGV opening level such that it is equal to or less than the opening level limit in the limiting process P6. This limiting of the opening level of the waste gate valve 27 may be performed in another aspect. For example, the limiting of the opening level may be performed by sending a product obtained by multiplying the value of the target WGV opening level set in the target opening level setting process P5 by a coefficient equal to or greater than "0" and less than "1" as the value of the target WGV opening level to the drive process P7.

What is claimed is:

1. An engine control device that is applied to an engine including a combustion chamber in which combustion of an air-fuel mixture is performed, an intake air passage into which intake air introduced into the combustion chamber flows, an injector that injects fuel into intake air, an exhaust passage into which exhaust gas generated by combustion of the air-fuel mixture in the combustion chamber flows, a turbocharger including a compressor that is installed in the intake air passage and a turbine that is installed in the exhaust passage, a catalyst device that is a catalyst device for exhaust emission control provided downstream from the turbine in the exhaust passage, that carries a three-way catalyst, and that has an oxygen storage capability, a front air-fuel ratio sensor that is installed in a part upstream from the catalyst device in the exhaust passage, and a rear air-fuel ratio sensor that is installed in a part downstream from the catalyst device in the exhaust passage, wherein the turbine includes a turbine wheel that rotates with exhaust gas applied thereto, a bypass passage that is a passage for exhaust gas bypassing the turbine wheel, and a waste gate valve that is a valve for changing a passage area for exhaust gas of the bypass passage, wherein the engine control device is configured to control an opening level of the waste gate valve depending on an operation state of the engine and is configured to perform:

a main air-fuel ratio feedback process of feedback-controlling an amount of fuel injected from the injector such that an air-fuel ratio of an air-fuel mixture which is combusted in the combustion chamber reaches a target air-fuel ratio based on an output from the front air-fuel ratio sensor;

a sub air-fuel ratio feedback process of alternately switching the target air-fuel ratio between a rich-side target air-fuel ratio which is an air-fuel ratio richer than a stoichiometric air-fuel ratio and a lean-side target air-fuel ratio which is an air-fuel ratio leaner than the stoichiometric air-fuel ratio and determining a switching timing of the target air-fuel ratio based on an output from the rear air-fuel ratio sensor; and a limiting process of setting an upper limit of a control range of the opening level of the waste gate valve to be less when a combustion operation of the engine continues to be performed for a long time without being stopped than otherwise.

2. The engine control device according to claim 1, wherein the limiting process is performed based on the premise that fluctuation in load of the engine is small.

3. The engine control device according to claim 1, wherein the engine is mounted in a vehicle that is able to perform cruise control for automatically operating an accelerator such that a vehicle speed is maintained at a preset speed, and wherein the limiting process is performed based on the premise that the cruise control is being performed.

4. The engine control device according to claim 1, wherein the limiting process is performed based on the premise that deterioration of the catalyst device is ascertained.

5. The engine control device according to claim 1, wherein whether the combustion operation of the engine continues to be performed for a long time without being stopped is determined based on a total value of an intake flow rate of the engine in a period in which the combustion operation is maintained.

* * * * *